United States Patent
Shin et al.

(10) Patent No.: US 9,363,342 B2
(45) Date of Patent: Jun. 7, 2016

(54) MOBILE TERMINAL AND ARRANGEMENT TO GENERATE A BENDING FORCE ON A DISPLAY

(71) Applicant: LG ELECTRONICS INC., Seoul (KR)

(72) Inventors: Minchul Shin, Seoul (KR); Dongyoup Han, Seoul (KR); Jaeyoung Han, Seoul (KR); Dongjun Choi, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/581,604

(22) Filed: Dec. 23, 2014

(65) Prior Publication Data

US 2015/0256658 A1    Sep. 10, 2015

Related U.S. Application Data

(60) Provisional application No. 61/948,265, filed on Mar. 5, 2014.

(51) Int. Cl.
*H04M 1/02* (2006.01)
*G06F 1/16* (2006.01)
*G02F 1/1333* (2006.01)

(52) U.S. Cl.
CPC ............ *H04M 1/0268* (2013.01); *G06F 1/1637* (2013.01); *H04M 1/0266* (2013.01); *H04M 1/0277* (2013.01); *G02F 1/133305* (2013.01); *G02F 2001/133314* (2013.01); *G02F 2202/28* (2013.01)

(58) Field of Classification Search
CPC ..................... H04M 1/72583; H04M 1/72522; H04M 1/72547

USPC ..................... 455/566, 575.1, 128, 145, 90.3; 379/330

See application file for complete search history.

(56) References Cited

U.S. PATENT DOCUMENTS

| | | | | |
|---|---|---|---|---|
| 4,809,471 | A * | 3/1989 | Wichman | G09F 15/0068 52/109 |
| 2007/0053504 | A1* | 3/2007 | Sato | F16C 11/12 379/156 |
| 2009/0015747 | A1 | 1/2009 | Nishizawa et al. | |
| 2010/0033648 | A1* | 2/2010 | Kaganezawa | G02F 1/133305 349/58 |
| 2010/0238370 | A1* | 9/2010 | Matsumoto | G02F 1/133305 349/58 |
| 2012/0011755 | A1* | 1/2012 | Bertrand | G09F 7/18 40/594 |
| 2012/0242588 | A1 | 9/2012 | Myers et al. | |
| 2013/0222298 | A1 | 8/2013 | Kato et al. | |

(Continued)

FOREIGN PATENT DOCUMENTS

EP    2664957    11/2013

OTHER PUBLICATIONS

European Patent Office Application Serial No. 15000141.0, Search Report dated Jul. 28, 2015, 7 pages.

*Primary Examiner* — Alejandro Rivero
(74) *Attorney, Agent, or Firm* — Lee, Hong, Degerman, Kang & Waimey; Jonathan Kang; Richard Salfelder

(57) ABSTRACT

A mobile terminal is provided that includes a display configured to output visual information, a frame covering a rear surface of the display, and an adhesive member that provided between the rear surface of the display and the frame and configured to couple the display to the frame, the frame formed in a curved shape to generate a bending force causing the display to curve when the display is coupled to the frame using the adhesive member.

18 Claims, 9 Drawing Sheets

(56) References Cited

U.S. PATENT DOCUMENTS

| | | | |
|---|---|---|---|
| 2013/0279088 A1* | 10/2013 | Raff | G06F 1/1637 361/679.01 |
| 2014/0002385 A1* | 1/2014 | Ka | G06F 1/1601 345/173 |
| 2014/0002973 A1* | 1/2014 | Lee | H05K 7/00 361/679.01 |
| 2014/0002975 A1* | 1/2014 | Lee | H05K 5/0017 361/679.01 |
| 2014/0036162 A1* | 2/2014 | Sato | G06F 1/1652 348/836 |
| 2014/0233203 A1* | 8/2014 | Ohtomo | G02F 1/133308 361/809 |
| 2014/0254111 A1* | 9/2014 | Yamazaki | H01L 51/0097 361/749 |
| 2015/0024651 A1* | 1/2015 | Cho | H05B 33/10 445/24 |
| 2015/0153780 A1* | 6/2015 | Maatta | G06F 1/1656 361/679.27 |
| 2015/0192952 A1* | 7/2015 | Jung | G06F 1/1601 361/747 |
| 2015/0248149 A1* | 9/2015 | Yamazaki | G06F 1/1635 361/679.27 |
| 2015/0258759 A1* | 9/2015 | Kim | B32B 37/10 156/60 |
| 2015/0261033 A1* | 9/2015 | Shin | H05K 5/0086 349/58 |

* cited by examiner

MOBILE TERMINAL AND ARRANGEMENT TO GENERATE A BENDING FORCE ON A DISPLAY

CROSS-REFERENCE TO RELATED APPLICATIONS

Pursuant to 35 U.S.C. §119(a), this application claims the benefit of earlier filing date and right of priority to Korean Application No. 10-2014-0050222, filed on Apr. 25, 2014 and also claims the benefit of U.S. Provisional Application No. 61/948,265, filed on Mar. 5, 2014, the contents of all of which are incorporated by reference herein in their entireties.

FIELD OF THE INVENTION

The present invention relates to a mobile terminal having a display unit in a curved shape.

RELATED ART

Terminals may be divided into mobile/portable terminals and stationary terminals according to their mobility. Also, the mobile terminals may be classified into handheld terminals and vehicle mount terminals according to whether or not a user can directly carry.

Mobile terminals (or electronic devices) may be configured to perform various functions, for example, data and voice communication, capturing images or video, storing voice, reproducing music files via a speaker system, displaying images or video and the like. Some of mobile terminals may include an additional function of playing electronic games, and other mobile terminals may be implemented as multimedia players. In addition, in recent time, mobile terminals can receive multicast signals to allow viewing of visual contents, such as broadcasting, video or television programs.

As it becomes multifunctional, a mobile terminal can be allowed to capture still images or moving images, play music or video files, play games, receive broadcast and the like, so as to be implemented as an integrated multimedia player.

Furthermore, many efforts are undergoing to support or enhance various functions of such mobile terminals. Such many efforts include changes and improvement of structural components implementing a mobile terminal and/or software or hardware improvement.

In view of the improvements of the structural components, mobile terminals are evolving into various design shapes. Accordingly, a mobile terminal with a display unit in a curved shape is attracting attention. In response to such attention to the curved display unit, active researches on a device structure focusing on the curved display unit are undergoing.

SUMMARY OF THE INVENTION

Therefore, an aspect of the detailed description is to provide a structure capable of implementing the conventional flat display into a curved display.

Another aspect of the detailed description is to provide a new device structure focusing on a curved display unit.

To achieve these and other advantages and according to the present invention, as embodied and broadly described herein, there is provided a mobile terminal including a display that is configured to output visual information thereon, and to be curved, a frame that is disposed to cover a rear surface of the display, and an adhesive member that is provided between the rear surface of the display and the frame and configured to couple the display to the frame, wherein the frame is formed in a curved shape to generate a bending force making the display curved when the display is coupled to the frame using the adhesive member.

According to one embodiment of the present invention, the frame may be formed curved along one direction of a terminal body, such that the display has a curved shape along the one direction.

The frame may be provided with a bead which protrudes therefrom to reinforce rigidity of the frame such that the bending force making the display curved is maintained.

The bead may extend along the one direction.

According to another embodiment of the present invention, a portion of the adhesive member, corresponding to a central region of the display, may be affected by a force applied in a direction that the display is separated from the frame.

The adhesive member may be an adhesive or an adhesive tape.

According to another embodiment of the present invention, the display may include a display panel to which an image is output, and a backlight unit that is disposed to cover a rear surface of the display panel and configured to emit light toward the display panel. Here, the adhesive member may be disposed between the backlight unit and the frame.

The frame may include an accommodating portion that is configured to accommodate the backlight unit therein, and has a curved shape to generate a bending force making the backlight unit curved, and first and second mounting portions on which both end portions of the display panel are mounted, respectively. Here, a distance between the first and second mounting portions may be shorter than a length between the both end portions of the display panel, such that the display panel is curved when the both end portions of the display panel are coupled to the first and second mounting portions, respectively.

The first and second mounting portions may be inclined toward the accommodating portion, such that the display panel is curved toward the accommodating portion.

According to another embodiment of the present invention, the mobile terminal may further include a window that is disposed to cover an upper surface of the display so as to form one surface of the terminal body, and has a curved shape to correspond to the display, and a case that is provided with a window mounting portion on which the window is mounted, and is configured to accommodate the frame therein.

A mounting surface of the window mounting portion, to which the window is coupled, may be formed in a curved shape, such that a bending force making the window curved is generated when the window is coupled to the window mounting portion.

The case may further include a frame mounting portion that extends from the window mounting portion to cover the rear surface of the frame, and has a curved shape to correspond to the curved frame.

An adhesive or an adhesive tape for fixing the frame to the frame mounting portion may be provided between the frame and the frame mounting portion.

A boss may protrude from the rear surface of the frame to be inserted into a through hole of the frame mounting portion, and a coupling member may be inserted into the boss to couple the frame to the case.

The case may be provided with a hollow portion that is surrounded by the window mounting portion to form a space for accommodating the frame therein. The case may be coupled with a printed circuit board that is disposed to cover the hollow portion and reinforces rigidity of the case such that the bending force making the window curved is maintained.

The printed circuit board may be formed in a curved shape to correspond to the curved frame.

An elastic pad may be provided between the frame and the printed circuit board, so as to elastically support at least part of the frame to prevent the frame and the printed circuit board from being shaken due to a difference of curvature between the frame and the printed circuit board.

The elastic pad may surround a central region of the frame.

According to another embodiment of the present invention, the window may be coupled to the display.

According to another embodiment of the present invention, an air gap may be provided between the window and the display.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, the present invention will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
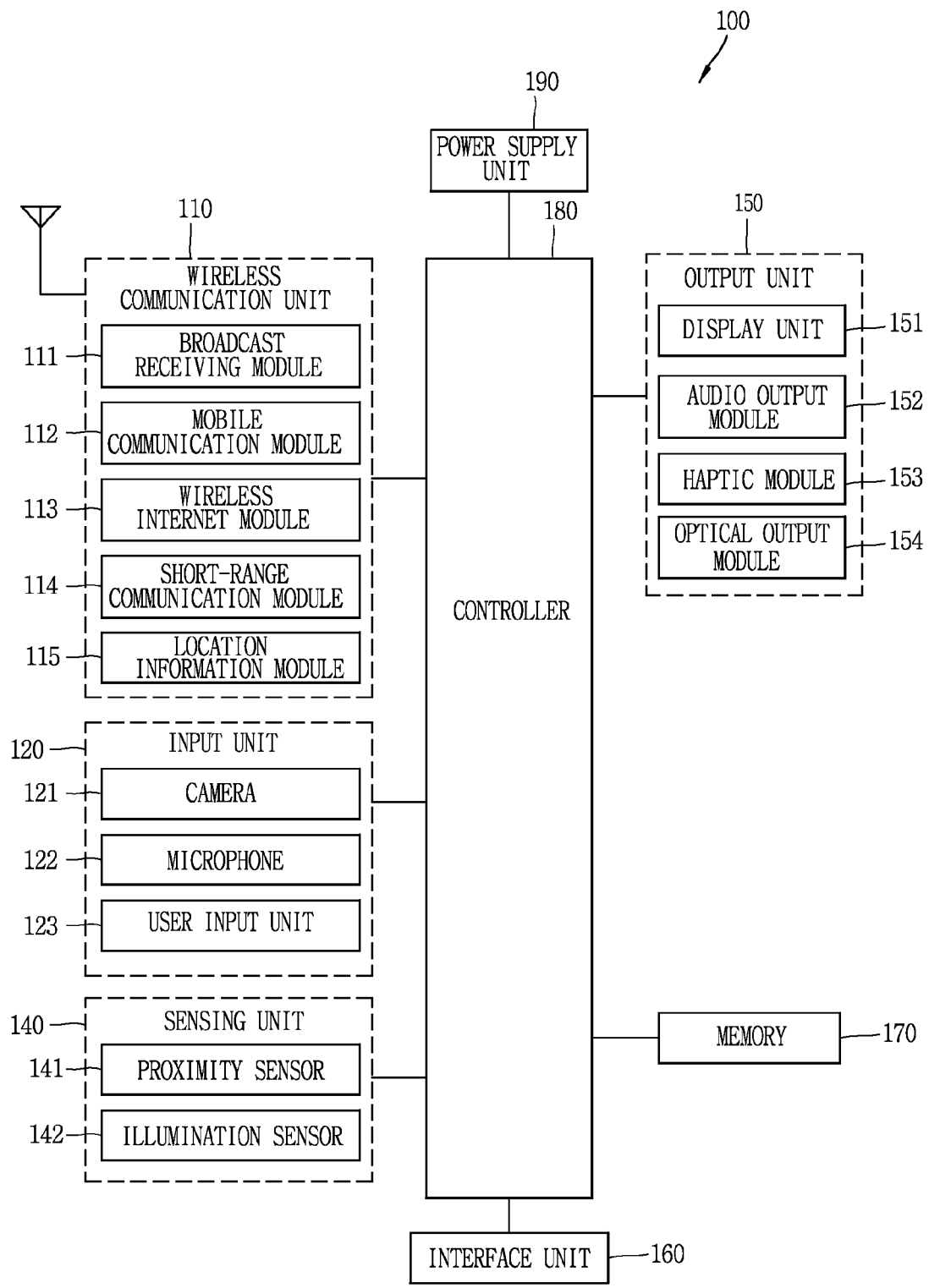
FIG. 1 is a block diagram of a mobile terminal according to one exemplary embodiment of the present invention.

FIG. 1 is a block diagram of a mobile terminal according to one exemplary embodiment of the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among those components, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 (or an image input device) for an image signal input, a microphone 122 (or an audio input device) for an audio signal input, and a user input unit 123 (for example, a touch key, a push key, a mechanical key, a soft key, and the like) for allowing a user to input information. Data (for example, audio, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 may be configured to utilize information obtained from the sensing unit 140, and in particular, information obtained from at least two sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or applications) executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operations of the mobile terminal 100, in addition to the operations associated with the application programs. The controller 180 may provide or process information or functions appropriate for a user by processing signals, data, information and the like, or activating application programs stored in the memory 170.

Also, the controller 180 may control some or all of the components illustrated in FIG. 1 according to the execution of an application program that have been stored in the memory 170. In addition, the controller 180 may combine two or more components included in the mobile terminal 100 for operation to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi) Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct and Wireless USB. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 may have a more extended lifespan and higher utilization than the contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The illumination sensor 142 is configured to sense brightness of light around the terminal body. The mobile terminal 100 may be configured to automatically control illumination of the display unit 151, using the illumination sensor 142, according to the amount of peripheral light.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority to use the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
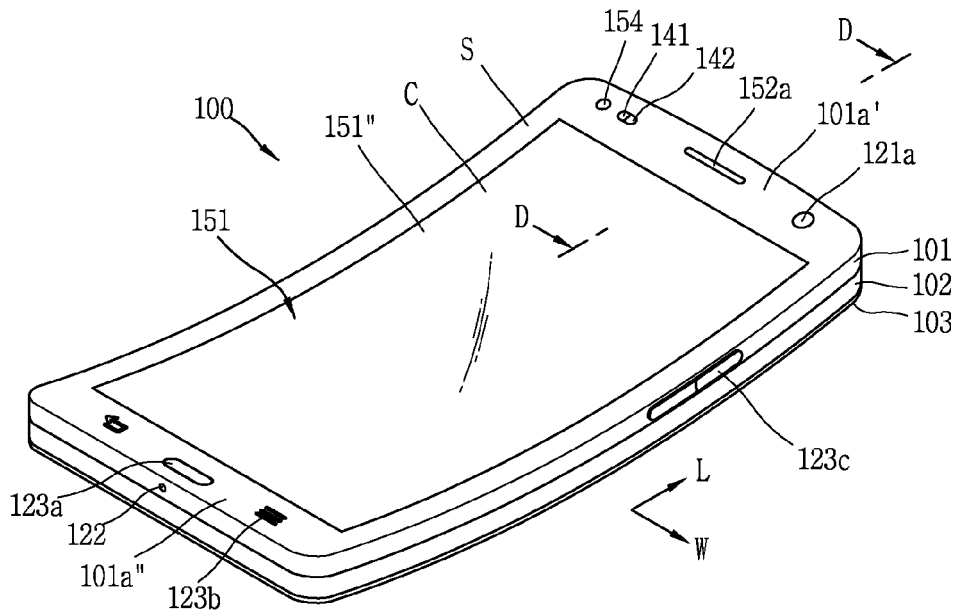
FIGS. 2 and 3 are conceptual views of one example of a mobile terminal, viewed from different directions, according to the present invention.
Figure 3:
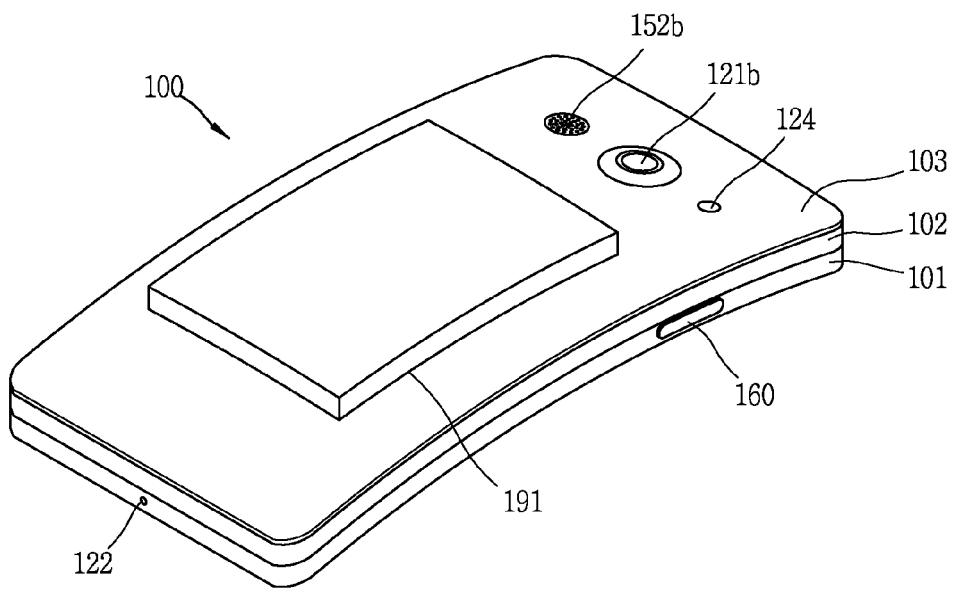

FIGS. 2 and 3 are conceptual views of one example of a mobile terminal, viewed from different directions, according to the present invention.

As illustrated in FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, a first manipulation unit 123a, 123b, a second manipulation unit 123c, a microphone 122, an interface unit 160, and the like.

Hereinafter, description will be given, as illustrated in FIGS. 2 and 3, of an exemplary embodiment of a mobile terminal, in which the display unit 151, the first audio output module 152a, the proximity sensor 141, the illumination sensor 142, the optical output module 154, the first camera 121a and the first manipulation units 123a and 123b are disposed on a front surface of a terminal body, the second manipulation unit 123c, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the present invention. Some components may be omitted or rearranged. For example, the first manipulation unit 123a, 123b may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a, 123b.

The first audio output module 152a may be implemented in the form of a receiver to transfer voice audio to a user's ear, and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first manipulation unit 123a, 123b and the second manipulation unit 123c are examples of the user input unit 123, which may be manipulated by a user to provide input to the mobile terminal 100. The first and second manipulation units 123a, 123b and 123c may also be commonly referred to as a manipulating portion, and may employ any tactile method that allows the user to perform manipulation such as touch, push, scroll, or the like. The first and second manipulation units 123a, 123b and 123c may also employ any non-tactile method that allows the user to perform manipulation such as proximity touch, hovering, or the like.

FIGS. 2 and 3 illustrate the first manipulation unit 123a, 123b as a combination of a mechanical key 123a and a touch key 123b.

Input received at the first manipulation unit 123a, 123b and the second manipulation unit 123c may be used in various ways. For example, the first manipulation unit 123a, 123b may be used by the user to provide an input to a menu, home key, cancel, search, or the like, and the second manipulation unit 123c may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a, 123b in the rear input unit. As such, in situations where the first manipulation unit 123a, 123b is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 according to the present invention may be formed in a curved shape along one direction of the terminal body, and this type is referred to as a curved display unit 151, hereinafter.

This exemplary embodiment illustrates that the curved display unit 151 is curved along a lengthwise direction L of the terminal body. That is, the curved display unit 151 may have a shape that both end portions thereof adjacent to the first audio output module 152a and the microphone 122, respectively, are curved with respect to a central portion of the curved display unit 151. Unlike this, the display unit 151 may also be formed in a shape curved along a widthwise direction W of the terminal body.

In addition to the curved display unit 151 in the curved shape, the mobile terminal 100 may also be formed in the curved shape on the whole. For example, the front case 101, the rear case 102 and the rear cover 103 may have a curved shape to correspond to the curved display unit 151. In addition to those cases, various types of electronic components mounted in the mobile terminal, for example, the battery 191 may also be formed in a curved shape.

Hereinafter, the curved display unit 151 and a device structure based on the curved display unit 151 will be described in more detail with reference to the accompanying drawings.

Figure 4:
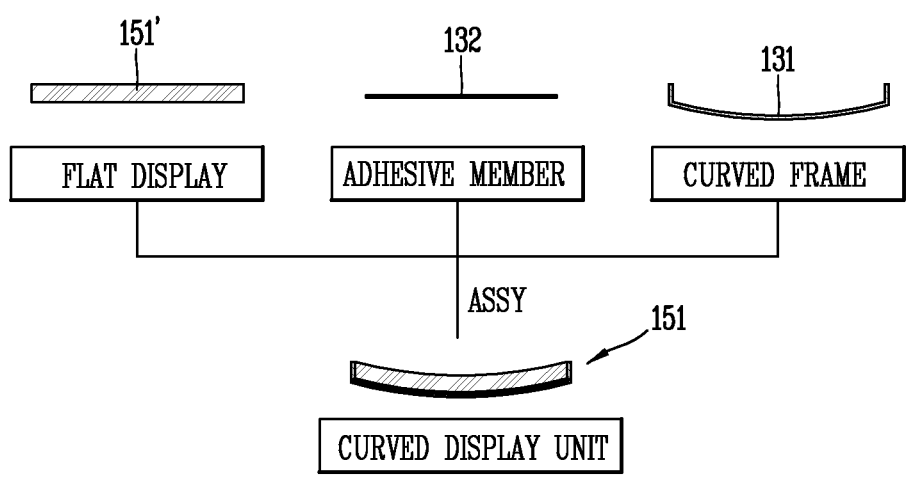
FIG. 4 is a conceptual view illustrating that the conventional flat display is implemented into a curved display.

FIG. 4 is a conceptual view illustrating that the conventional flat display 151' is implemented into a curved display 151'.

The display 151' may be configured to output visual information thereon, and can be curved when an external force is applied thereto. For example, the display 151' independently has a flat shape but may be changed into a curved shape by being coupled to the frame 131. Here, the display 151' may have a preset curvature of radius.

As illustrated, the flat display 151' is coupled to the frame 131. The frame 131 is formed in a curved shape, such that the display 151' can be changed into the curved shape to correspond to the shape of the frame 131 when the display 151' is coupled thereto. The frame 131 may be made of various materials, such as a metallic material (for example, stainless steel, magnesium, aluminum, etc.), a synthetic resin material and the like.

An adhesive member (or coupling member) 132 may be provided between the display 151' and the frame 131 to couple the display 151' and the frame 131 to each other. The adhesive member 132 may be disposed to cover all or part (for example, a central region) of the rear surface of the display 151'. The adhesive member 132 may be an adhesive, such as optical clear adhesive (OCA) or optical clear resin (OCR), or an adhesive tape.

In such a manner, the display 151' is curved by an external force applied when it is coupled to the frame 131 by the adhesive member 132. The frame 131 generates a force making the display 151' curved, namely, a bending force. When the adhesive member 132 is disposed to cover the entire rear surface of the display 151', a portion of the adhesive member 132, which corresponds to the central region of the display 151', is affected by a force (tensile force) applied in a direction that the display 151' is separated from the frame 131. On the other hand, a portion of the adhesive member 132, which corresponds to an edge region of the display 151', is affected by a force applied in direction that the frame 131 presses the display 151'.

As aforementioned, the conventional flat display 151' may be implemented into the curved display 151' by being coupled to the frame 131. The curved display 151' can have various curvatures by adjusting the curvature of the frame 131.

Specifically, the structure may be employed for implementing the conventional liquid crystal display (LCD) into the curved display 151'. Comparing with the case of implementing the curved display using an OLED, the case of implementing the curved display using the LCD has an advantage in view of fabricating the curved display unit with lower costs.

The implementation of the shapes of the display 151' and the frame 131 may not be limited to the aforementioned way. Various methods may be applied for the shape implementation. In detail, the display 151' may be formed in a curved shape by a device (JIG) or a manual operation prior to being coupled to the frame 131. Also, the frame 131 may be fabricated in a curved shape from the beginning or first fabricated in a flat shape and thereafter changed into a curved shape by a device or a manual operation.

For example, the display 151' in a flat shape may be coupled to the frame 131 in a flat shape. The assembly of the display 151' and the frame 131 may be changed into a curved shape by a device or a manual operation. Or, the display 151' may be formed into a curved shape by a device or a manual operation prior to being coupled to the frame 131, and then coupled to the curved frame 131.

Hereinafter, a structure of implementing the curved display 151' will be described in more detail.

Figure 5:
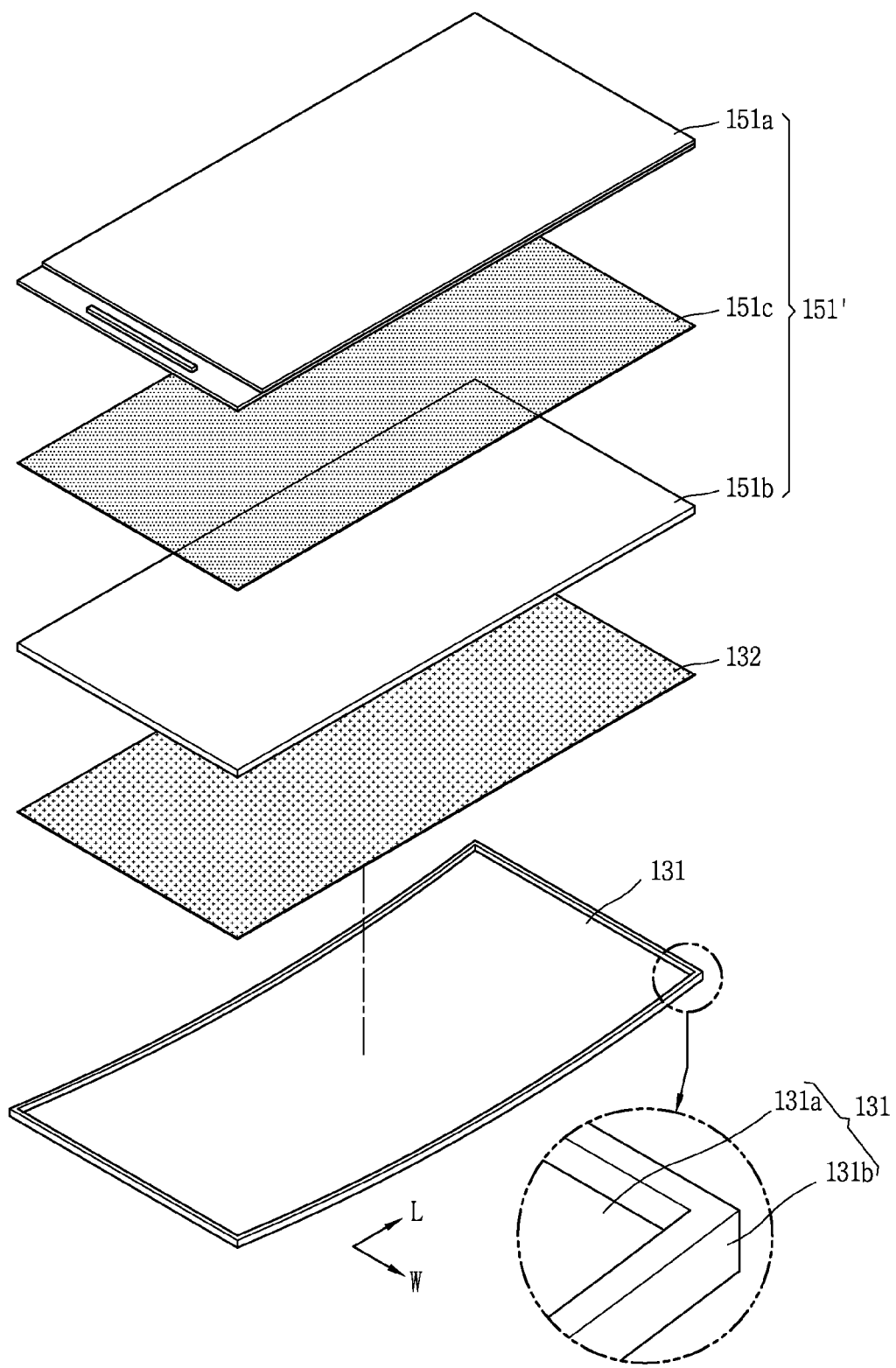
FIG. 5 is a disassembled perspective view illustrating one exemplary embodiment of a curved display according to the present invention.

FIG. 5 is a disassembled perspective view illustrating one exemplary embodiment of a curved display 151' disclosed herein.

As illustrated in FIG. 5, the display 151' may include a display panel 151a on which an image is displayed, and a backlight unit 151b which emits light toward the display panel 151a.

The display panel 151a may include color filter (CF) glass and thin film transistor (TFT) glass, which are spaced apart from each other, a liquid crystal filled between the CF glass and the TFT glass, a polarizer disposed on an upper surface of the CF glass, and another polarizer disposed on a rear surface of the TFT glass.

The backlight unit 151b may include a light source, a light guide plate guiding light emitted from the light source, a reflection film disposed on a rear surface of the light guide plate, and a diffusion film and a prism sheet laminated on the light guide plate.

An adhesive layer 151c may be provided between the display panel 151a and the backlight unit 151b for coupling them to each other. The adhesive layer may be an adhesive, such as optical clear adhesive (OCA) or optical clear resin (OCR), or an adhesive tape.

The display 151' may be interlayered or integrally formed with a touch sensor, to implement a touch screen. The touch screen may provide an input interface as well as an output interface between the mobile terminal and a user.

The frame 131 is disposed to cover a rear surface of the backlight unit 151b. The frame 131 may be formed curved in one direction of the terminal body such that the display unit 151' can have a shape curved in the one direction. For example, as illustrated, the frame 131 may have a shape curved along a lengthwise direction L of the terminal body.

Referring to FIG. 5, the frame 131 may be formed to accommodate at least part of the display unit 151'. For example, as will be explained later, the backlight unit 151b may be accommodated in the frame 131. In this case, sidewalls 131b which protrude from a bottom surface 131a of the frame 131 prevent light generated from the backlight unit 151b from being leaked in a lateral direction. The frame 131 may be formed of white synthetic resin. Or, the frame 131 may be formed of a metal with a white film attached onto its inner side. When the frame 131 is formed with the structure, it may surround the backlight unit 151b. This may result in no need of the conventional reflection member which reflects light leaked in the lateral direction of the backlight unit 151b.

Unlike this, the frame 131 may be formed in a shape of a curved plate and coupled to a rear surface of the backlight unit 151b. Here, the backlight unit 151b coupled to the frame 131 may be curved to correspond to the curved shape of the frame 131, and the display panel 151a coupled to the backlight unit 151b may also be changed into a curved shape to correspond to the curved backlight unit 151b.

Meanwhile, the bottom surface 131a of the frame 131 may be formed smooth such that stress cannot be locally concentrated on the backlight unit 151b mounted thereon. Also, the adhesive member 132 may be formed of a predetermined elastic material, so as to elastically fill up an uneven portion of the bottom surface 131a.

Figure 6:
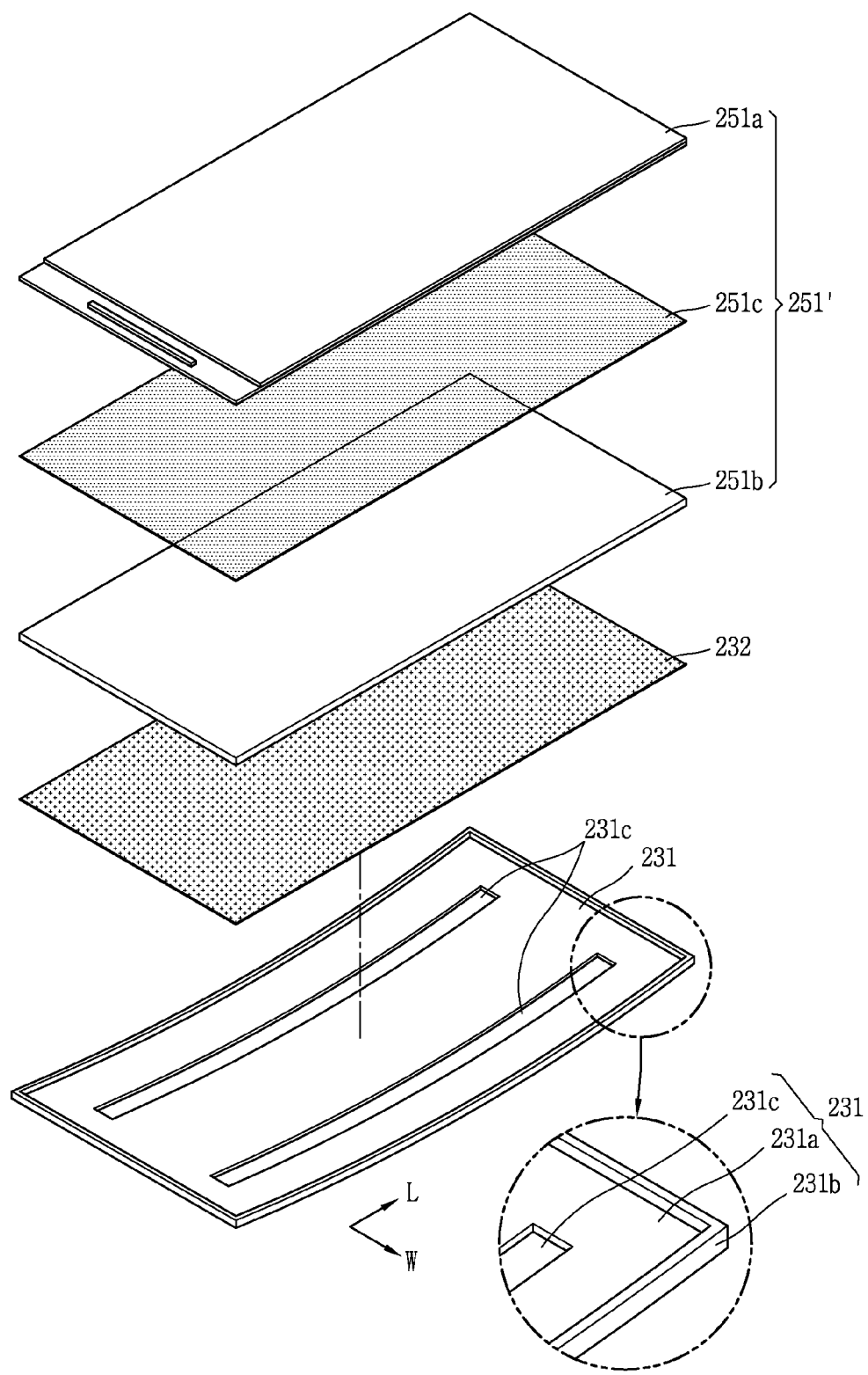
FIG. 6 is a disassembled perspective view illustrating another exemplary embodiment of a curved display unit according to the present invention.

FIG. 6 is a disassembled perspective view illustrating another embodiment of a curved display unit 251' disclosed herein.

As illustrated in FIG. 6, this exemplary embodiment may be implemented the same as the foregoing embodiment except for a frame 231. In detail, a bead 231c protrudes from the frame 231 to reinforce rigidity of the frame 231, such that a force (or bending force) making the display 251' curved cam be maintained.

Still referring to FIG. 6, the bead 231c may extend along a curved direction of the frame 231, and be provided in plurality. Shape and position of the bead 231c may vary. For example, the bead 231c may be formed such that at least a part thereof is formed bent.

The bead 231c may protrude from one surface of the frame 231 through a pressing process. Here, a portion of the other surface of the frame 231, corresponding to the bead 231c, is relatively recessed. In order to prevent the bead 231c from changing the shape of the display unit 251' due to coming in contact with the display unit 251', as illustrated, the relatively recessed portion may face the rear surface of the display unit 251'.

Figure 7:
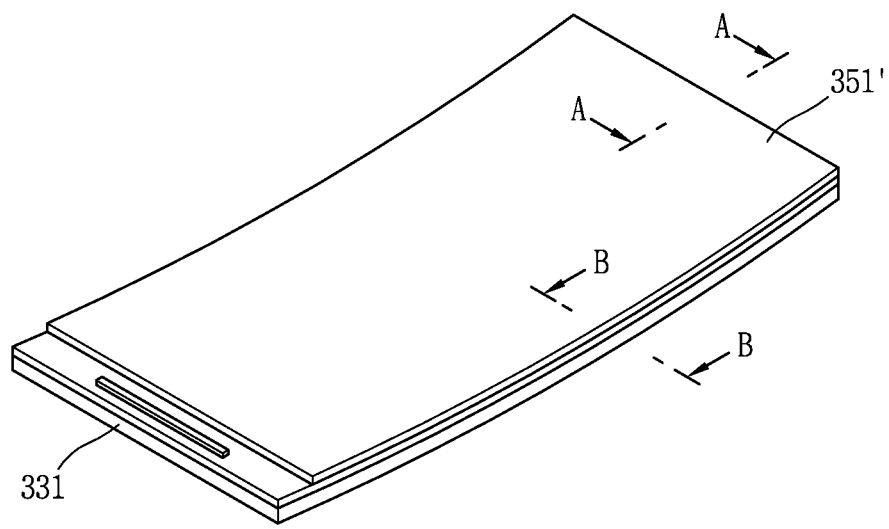
FIG. 7 is a conceptual view illustrating another exemplary embodiment of a curved display unit according to the present invention.
Figure 8:
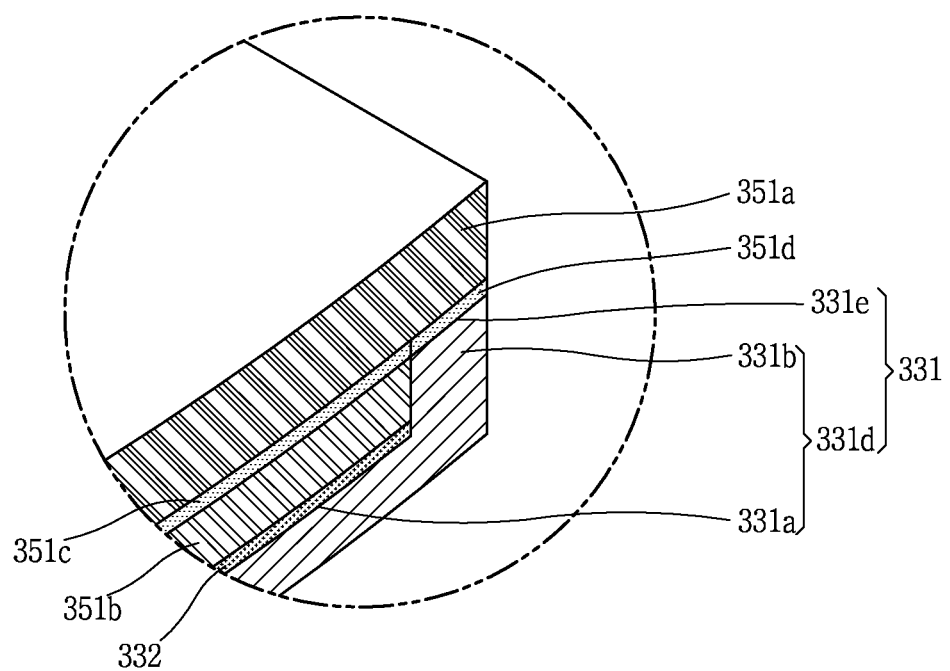
FIG. 8 is a sectional view taken along the line A-A illustrated in FIG. 7.
Figure 9:
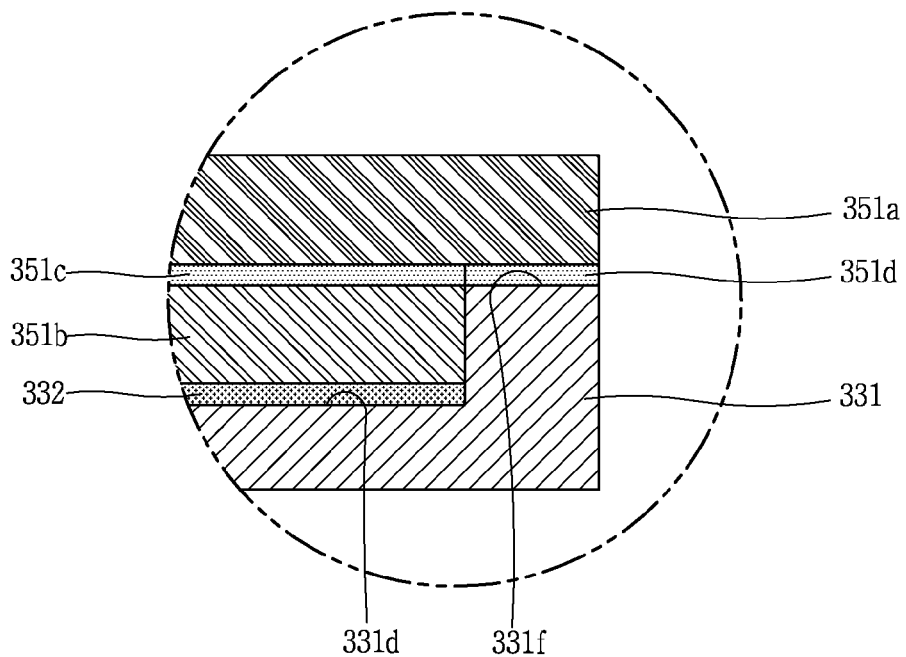
FIG. 9 is a sectional view taken along the line B-B illustrated in FIG. 7.

FIG. 7 is a conceptual view illustrating another embodiment of a curved display unit 351' disclosed herein, FIG. 8 is a sectional view taken along the line A-A illustrated in FIG. 7, and FIG. 9 is a sectional view taken along the line B-B illustrated in FIG. 7.

The foregoing embodiment has illustrated the structure that the backlight unit 151b is curved in correspondence with the curved shape of the frame 131 upon being coupled to the frame 131, and the display panel 151a coupled to the backlight unit 151b is also curved by the curved backlight unit 151b. This exemplary embodiment illustrates a structure that a display panel 351a is changed in shape due to being coupled to a frame 331.

Referring to FIGS. 7 to 9, the frame 331 may include an accommodating portion 331d, via which the backlight unit 351b is changed in shape, and a mounting portion 331e by which the display panel 351a is changed in shape.

The accommodating portion 331d of the frame 331 in which the backlight unit 331b is accommodated may be formed by a bottom surface 331a on which the backlight unit 351b is mounted, and sidewalls 331b extending from the bottom surface 331a to surround side surfaces of the backlight unit 351b.

The bottom surface 331a is formed in a curved shape to generate a force making the backlight unit 351b curved. An adhesive member 332 may be provided on the bottom surface 331a such that the backlight unit 351b is adhered onto the bottom surface 331a.

The mounting portion 331e which is coupled to the display panel 351a covering the backlight unit 351b is provided on the sidewalls 331b. The mounting portion 331e may include first and second mounting portions corresponding to both end portions of the display panel 351a. This exemplary embodiment illustrates that the first and second mounting portions, which correspond respectively to the both end portions of the display panel 351a in a lengthwise direction thereof, extend along a widthwise direction of the display panel 351a.

As illustrated, an adhesive layer 351d may be provided between the display panel 351a and the mounting portion 331e, such that the display panel 351a is coupled to the mounting portion 331e. Unlike this, an adhesive layer 351c provided between the display panel 351a and the backlight unit 351d may extend to couple the display panel 351a to the mounting portion 331e.

A distance between the first and second mounting portions may be shorter than a length between the both end portions of the display panel 351a in a flat state of the display panel 351a. Due to this difference, the display panel 351a is curved when the both end portions of the display panel 351a are coupled to the first and second mounting portions, respectively. Here, in order for the display panel 351a to be curved toward the accommodating portion 331d, the mounting portion 331e, as illustrated in FIG. 8, may be inclined toward the accommodating portion 331d.

The first and second mounting portions may have the same curvature of radius. Accordingly, when the display panel 351a is coupled to the mounting portion 331e, the display panel 351a may be changed in shape to correspond to the curvature of radius of the first and second mounting portions, thereby having a predetermined curvature of radius. Therefore, the curvature of radius of the display panel 351a may be adjusted by adjusting the curvature of radius of the first and second mounting portions.

Meanwhile, referring to FIG. 9, the sidewalls 331b may further be provided with side mounting portions 331f which connect the first and second mounting portions to each other and on which both sides of the display panel 351a are mounted. The side mounting portions 331f may have a curved shape, such that the display panel 351a can be curved to correspond to the shape of the side mounting portions 331f when the display panel 351a is coupled to the side mounting portions 331f.

The side mounting portions 331f may shield side surfaces of the backlight unit 351b, to prevent light emitted from the backlight unit 351b from being leaked in a lateral direction.

The side mounting portions 331f may include first and second side mounting portions corresponding to the both sides of the display panel 351a. The adhesive layer 351d may also be provided on the side mounting portions 331f. Here, the adhesive layer 351d may be implemented as a loop-shaped adhesive tape corresponding to the first and second mounting portions and the first and second side mounting portions. Unlike this, the adhesive layer 351c provided between the display panel 351a and the backlight unit 351b may extend to couple the display panel 351a and the side mounting portions 331f to each other.

Figure 10:
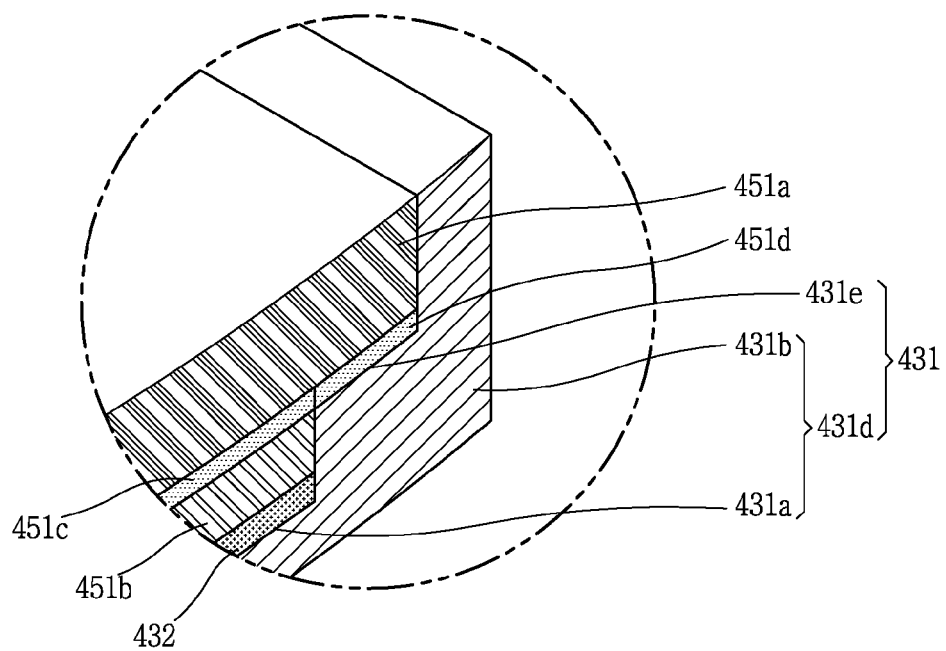
FIG. 10 is a conceptual view illustrating an exemplary variation of a frame illustrated in FIG. 7.

FIG. 10 is a conceptual view illustrating an exemplary variation of the frame 331 illustrated in FIG. 7.

As illustrated in FIG. 10, a frame 431 may be provided to surround side surfaces of a display panel 451a. That is, the sidewalls 431b of the frame 431, which protrude to surround side surfaces of a backlight unit 451b, may partially protrude more to surround the side surfaces of the display panel 451a.

The sidewalls 431b guide the display panel 451a to be mounted on a mounting portion 431e, and support a force applied in a lateral direction, of restoring force of the display panel 451a.

Hereinafter, a new device structure based on a curved display will be described.

Figure 11:
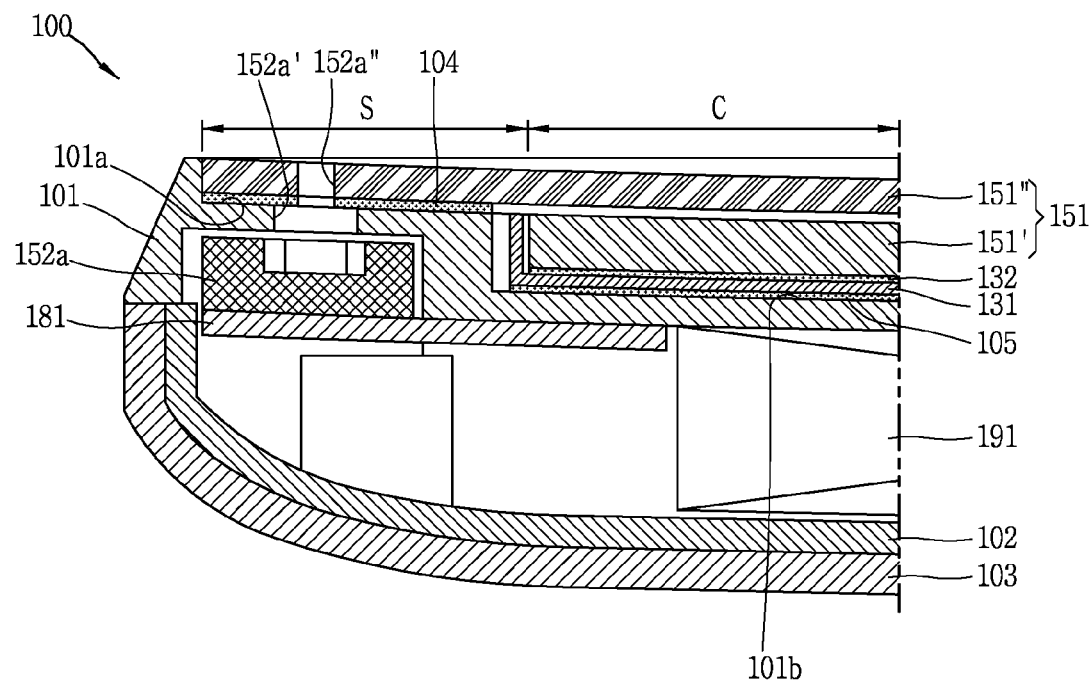
FIG. 11 is a sectional view taken along the line D-D of FIG. 2.

FIG. 11 is a sectional view taken along the line D-D of FIG. 2.

As illustrated in FIG. 11, the display unit 151 is provided on a front surface of the terminal body to output visual information thereon. The display unit 151 may include a display 151', and a window 151" disposed on the display 151'.

The window 151" may form the front surface of the mobile terminal 100 together with the front case 101. The window 151" may be formed of a light-transmittable material, for example, light-transmittable synthetic resin, tempered glass, and the like.

The window 151" may include a portion through which light cannot be transmitted. For example, referring to FIG. 11, the window 151" may be divided into a central region C and an edge region S surrounding the central region C. The central region C may preferably be formed transparent and colorless such that visual information output to the display 151' can be recognized from the outside, and the edge region S may preferably be formed colored and/or opaque such that an internal device structure of the mobile terminal cannot be exposed to the outside.

The window 151" may be formed in a curved shape to correspond to the display 151'. For example, the window 151" may be curved along a lengthwise direction L of the terminal body. Here, the window 151" may have a preset curvature of radius. The window 151" may be fabricated into a curved shape, or first fabricated into a flat shape and then changed into a curved shape through post-processing. Or, as will be explained later, the window 151" in a shape of a flat plate may be changed into a curved shape to correspond to the window mounting portion 101a when the window 151" is assembled with the front case 101.

The display 151' is disposed on a rear surface of the window 151" to output visual information through the window 151". The display 151' may have an area corresponding to a light-transmittable area of the window 151". This may allow the user to recognize visual information, which is output to the display 151', from the outside.

The window 151" and the display 151' may constitute the display unit 151. The display unit 151 may be implemented in a modularized structure in a manner of coupling the window 151" and the display 151' to each other, or implemented in a structure that the window 151" and the display 151' are separated from each other. FIG. 11 exemplarily illustrates the structure that the window 151" and the display 151' are separated from each other, namely, a structure having an air gap between the window 151" and the display 151'.

The display unit 151 is mounted onto a case. Hereinafter, description will be given of an example that the display unit 151 is mounted on the front case 101. However, the case may not be limited to the front case 101. The case may be other structure, different from the front case 101.

The front case 101 is provided with a window mounting portion 101a to which the window 151' is mounted and coupled. The window mounting portion 101a may be formed to support the edge region S of the window 151", and have a loop shape to surround the display 151'.

FIG. 11 illustrates the window mounting portion 101a provided on an upper portion of the mobile terminal 100. Referring to FIG. 11, a guide hole 152a' which guides sounds output from the first audio output module 152a may be provided at the window mounting portion 101a, such that the sounds can be externally emitted through an audio hole 152a" of the window 151".

A mounting surface of the window mounting portion 101a, to which the window 151" is coupled, may be formed in a curved shape. The mounting surface may have the curved shape to correspond to the window 151" which is fabricated in the curved shape or post-processed into the curved shape. Or, when the window 151" is produced in the shape of the flat plate, the window 151" may be changed into the curved shape to correspond to the mounting surface due to a bending force (or a curving force, namely, a force making the window 151" curved) applied when the window 151" is coupled to the window mounting portion 101a. Accordingly, the conventional flat window 151" may also be changed into the curved shape by being coupled to the front case 101, and the window 151" may easily have different curvatures by adjusting the curvature of the mounting surface.

As previously illustrated in FIG. 2, the window mounting portion 101a may include a first mounting surface 101a' and a second mounting surface 101a" corresponding to both end portions of the window 151" in a lengthwise direction L of the window 151". The first and second mounting surfaces 101a' and 101a" are provided at both sides with interposing the display 151' therebetween, and covered by the edge region of the window 151".

The first and second mounting surfaces 101a' and 101a" may have the same curvature of radius. Accordingly, when the window 151" is coupled to the window mounting portion 101a, the window 151" may be changed into the curved shape to correspond to the curvature of radius of the first and second mounting surfaces 101a' and 101a", so as to have a predetermined curvature of radius. Therefore, the curvature of radius of the window 151" may be adjustable by adjusting the curvature of radius of the first and second mounting surfaces 101a' and 101a".

When the flat window 151" is curved by being coupled to the curved mounting surfaces, the window 151" may be separated from the window mounting portion 101a by a restoring force. In order for the window 151" to keep on curved while being coupled to the first and second mounting surfaces 101a' and 101a", a bonding layer 104 may be disposed between the window 151" and the first mounting surface 101a' and between the window 151" and the second mounting surface 101a", respectively. The bonding layer 104 may be an adhesive, such as optical clear adhesive (OCA) or optical clear resin (OCR), or an adhesive tape. The bonding layer 104 may be affected by a tensile force, which is applied in a direction that the window 151" is separated from the window mounting portion 101a.

The front case 101 may further include a frame mounting portion 101b in which the frame 131 is accommodated. The frame mounting portion 101b may extend from the window mounting portion 101a to cover a rear surface of the frame 131.

As illustrated, the frame mounting portion 101b may have a curved shape to correspond to the curved frame 131. A curvature of radius of the frame mounting portion 101b may be decided by a curvature of radius of the frame 131. To prevent an edge portion of the frame 131 from being damaged due to coming in contact with the frame mounting portion 101b, the curvature of radius of the frame mounting portion 101b may be greater than or equal to the curvature of radius of the frame 131.

A bonding layer 105 by which the frame 131 is fixed onto the frame mounting portion 101b may be provided between the frame 131 and the frame mounting portion 101b. The bonding layer 105 may be an adhesive, such as optical clear adhesive (OCA) or optical clear resin (OCR), or an adhesive tape. The bonding layer 105 may be formed of a predetermined elastic resin material, so as to absorb an impact generated between the frame 131 and the frame mounting portion 101b.

Meanwhile, the PCB 181 may be provided on a rear surface of the frame mounting portion 101b. The PCB 181 may be configured as an example of the controller 180 (see FIG. 1) for controlling various functions of the mobile terminal 100, and various types of electronic components may be mounted to at least one surface of the PCB 181. As illustrated, the first audio output module 152a may be mounted to the PCB 181. The PCB 181 may be formed in a curved shape to correspond to the curved frame 131.

The battery 191 may also be provided on the rear surface of the frame mounting portion 101b. Here, the rear surface of the frame mounting portion 101b may be flat or curved to correspond to the shape of the battery 191. The PCB 181 may be formed on the frame mounting portion 101b except for the portion where the battery 191 is located.

Figure 12:
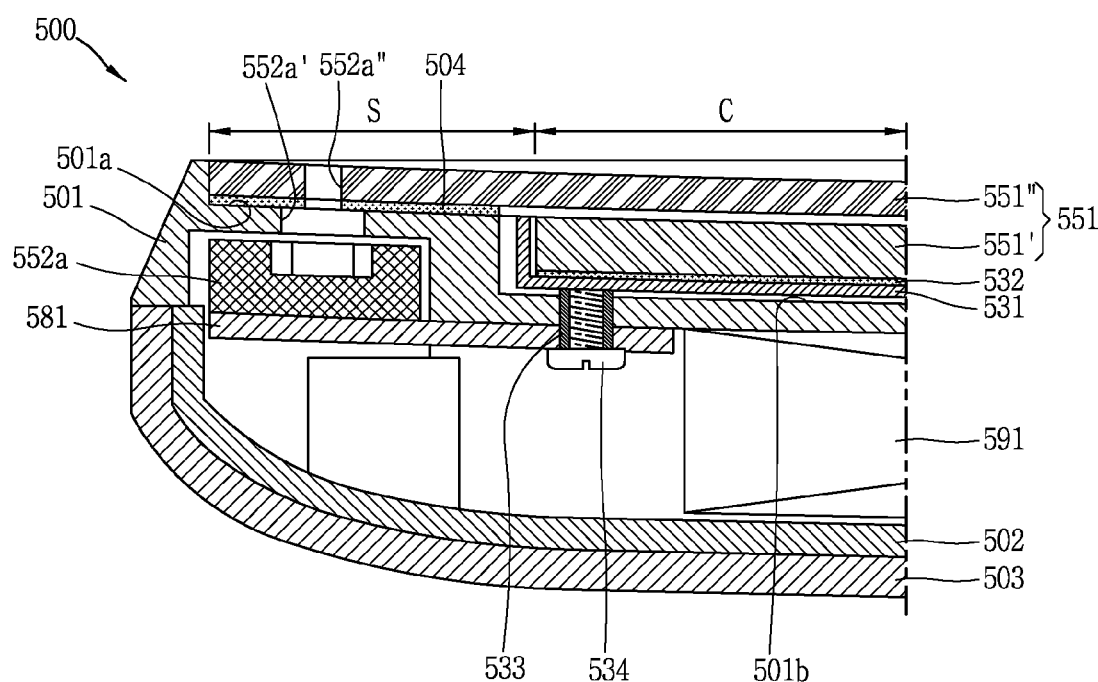
FIG. 12 a sectional view illustrating a coupling structure between a frame and a front case using a boss, which illustrates another exemplary embodiment of a mobile terminal according to the present invention.

FIG. 12 a sectional view illustrating a coupling structure between a frame 531 and a front case 501 using a boss 533, which illustrates another exemplary embodiment of a mobile terminal 500 disclosed herein.

As illustrated in FIG. 12, the frame 531 may be mechanically coupled to the front case 501 through a coupling structure. This exemplary embodiment illustrates that the boss 533 protrudes from a rear surface of the frame 531 to be inserted into a through hole of a frame mounting portion 501b and a coupling member 534 is inserted into the boss 533 to couple the frame 531 to the front case 501. The coupling member 534 may be a screw which is screwed into the boss 533.

The boss 533 may also be inserted into a through hole of a PCB 581 provided on the rear surface of the frame mounting portion 501b. Here, the frame 531, the front case 501 and the PCB 581 may be mechanically coupled together by the boss 533 and the coupling member 534.

Meanwhile, when the frame 531 is formed of a metal, the boss 533 may be coupled to the frame 531 in a welding manner. As the boss 533 is inserted into the through hole, the frame 531 may be arranged at a proper position within the frame mounting portion 501b, and restricted from being moved in a lateral direction. That is, an installation position of the frame 531 may be limited by the boss 533.

Figure 13:
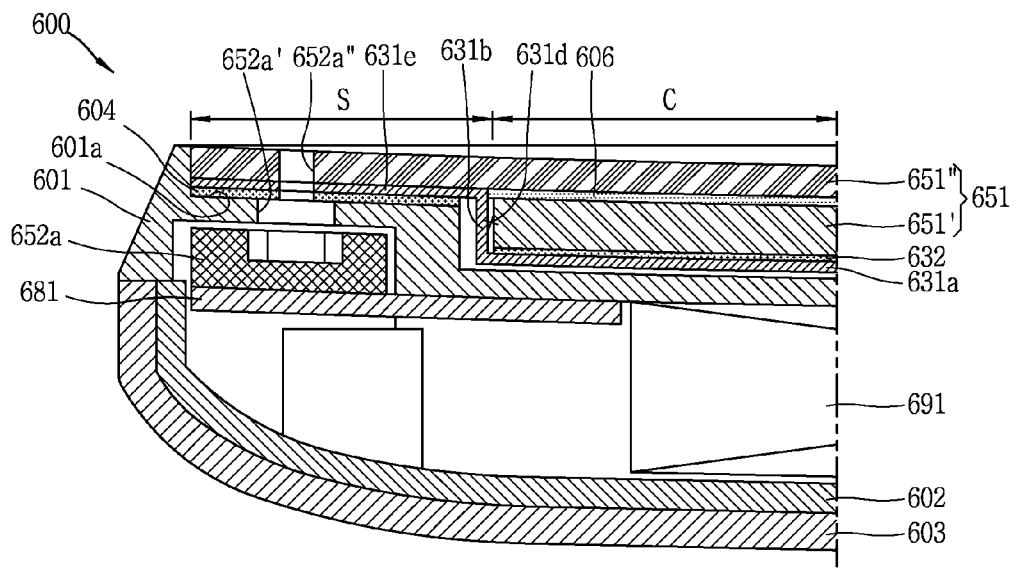
FIG. 13 is a sectional view illustrating a coupling structure between a frame and a window, which illustrates another exemplary embodiment of a mobile terminal according to the present invention.

FIG. 13 is a sectional view illustrating a coupling structure between a frame 631 and a window 651", which illustrates another exemplary embodiment of a mobile terminal 600 disclosed herein.

As illustrated in FIG. 13, the frame 631 may be disposed to cover a rear surface of an end portion of the window 651". In detail, the frame 631 may be provided with an accommodating portion 631d which is limited by a bottom surface 631a and sidewalls 631b to define a space for accommodating a display 651' therein, and a mounting portion 631e which extends from the sidewalls 631b to receive the rear surface of the window 651" thereon.

The mounting portion 631e may have a curved shape. The mounting portion 631e may have the curved shape to correspond to the window 151" which is fabricated in the curved shape or post-processed into the curved shape. Or, when the window 651" is produced in the shape of a flat plate, the window 651" may be changed into a curved shape to correspond to the mounting portion 631e due to a bending force (or a curving force, namely, a force making the window 651" curved) applied when the window 651" is coupled to the mounting portion 631e. Accordingly, the window 651" as well as the display 651' may also be changed into the curved shape by being coupled to the frame 631, and the window 651" may easily have different curvatures by adjusting the curvature of the mounting portion 631e.

Meanwhile, the window 651" may be modularized by being coupled to the display 651'. A bonding layer 606 may be provided between the window 651" and the display 651' for coupling them to each other. The bonding layer 606 may be an adhesive, such as optical clear adhesive (OCA) or optical clear resin (OCR), or an adhesive tape.

Here, a separate bonding layer may not be provided between the window 651" and the mounting portion 631e. That is, when the window 651" is coupled to the display 651', the window 651" may be mounted to the mounting portion 631e, and then changed into a curved shape to correspond to the mounting portion 631e by a bending force applied due to the curved mounting portion 631e. Of course, the separate bonding layer may also be provided between the window 651" and the mounting portion 631e.

The frame 631 to which the window 651" and the display 651' are coupled is mounted onto the front case 601. As illustrated in FIG. 13, a bonding layer 604 by which the frame 631 is fixed onto the front case 601 may be provided between the rear surface of the mounting portion 631e and the window mounting portion 601a.

Figure 14:
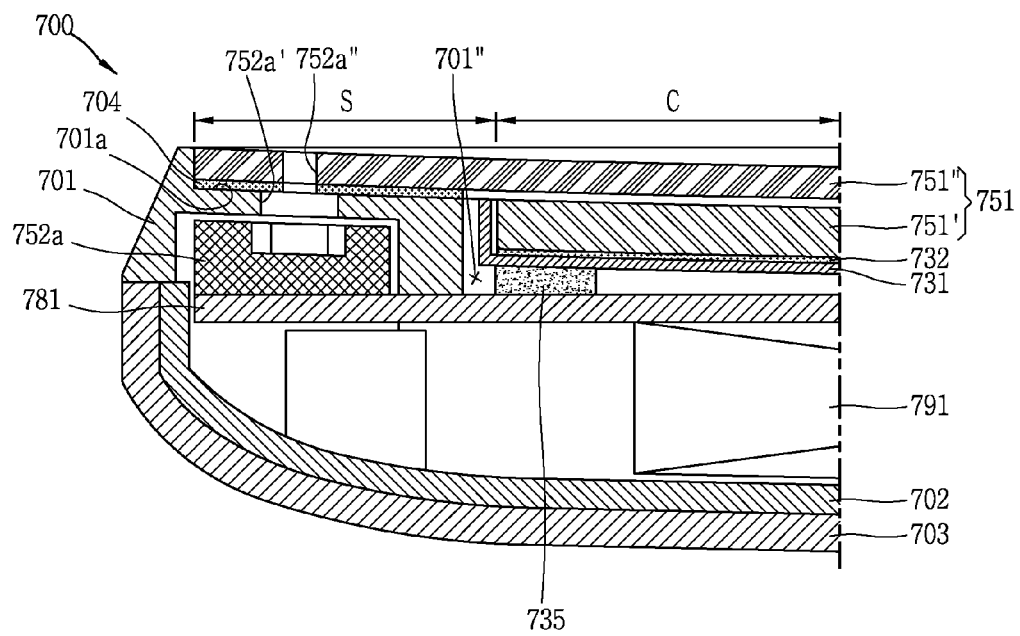
FIG. 14 is a sectional view illustrating another exemplary embodiment of a mobile terminal according to the present invention.

FIG. 14 is a sectional view illustrating another exemplary embodiment of a mobile terminal 700 disclosed herein.

As illustrated in FIG. 14, a front case 701 may be provided with a hollow portion 701" which is surrounded by a window mounting portion 701a. The hollow portion 701" may be formed to correspond to a frame 731 for accommodating the frame 731 therein.

A PCB 781 may be coupled to the front case 701, to cover a rear surface of the frame 731 accommodated in the hollow portion 701". Preferably, any electronic component may not be mounted to one surface of the PCB 781 which faces the frame 731. Rather, electronic components are mounted to the other surface of the PCB 781.

The PCB 781 is coupled to the front case 701, so as to reinforce rigidity of the front case 701, such that a bending force that the front case 701 makes the window 751" curved can be maintained. To reinforce the rigidity of the front case 701, the PCB 781 may be coupled to each of both end portions of the front case 701 facing each other. Also, PCB 781 may be disposed to cover the entire hollow portion 701".

The PCB 781 may be coupled to the front case 701 by using an adhesive, an adhesive tape, a hook, a boss and the like. An elastic pad 735 which prevents the frame 731 and the PCB 781 from being damaged due to a direct contact therebetween may be provided between the frame 731 and the PCB 781.

FIG. 14 exemplarily illustrates that the elastic pad 735 is disposed between the frame 731 and the PCB 781 to elastically support at least part of the frame 731. A pressed degree of the elastic pad 735 may depend on a gap between the frame 731 and the PCB 781. This exemplary embodiment illustrates that the frame 731 has the curved shape and the PCB 781 has a flat shape. Therefore, since the gap between the frame 731 and the PCB 781 is reduced from an edge portion toward a central portion of the frame 731, the elastic pad 735 may be pressed more toward the central portion.

In such a manner, the elastic pad 735 may elastically fill up the gap between the frame 731 and the PCB 781, so as to prevent the frame 731 and the PCB 781 from being shaken due to a difference of curvature therebetween.

The elastic pad 735 may have a loop shape for surrounding a central region of the frame 731. However, the shape of the elastic pad 735 may not be limited to this. The elastic pad 735 may formed in a shape of a plate corresponding to the rear surface of the frame 731, or be implemented with a plurality of small pads which are arranged on a plurality of points (for example, along an edge portion of the frame 731).

Meanwhile, FIG. 14 illustrates that the PCB 781 has a flat shape. Unlike this, the PCB 781 may have a curved shape to correspond to the curved frame 731.

A structure illustrated in one exemplary embodiment may be equally applied to a mobile terminal according to another exemplary embodiment, unless otherwise logically contradictory. For example, the embodiment related to FIG. 13 illustrates the structure of the display unit 651 which is modularized by coupling the display 651' and the window 651". Such modularized display unit 651 may equally be applied to other exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
 a display configured to output visual information;
 a frame that covers a rear surface of the display; and
 a coupling member between the rear surface of the display and the frame via which the display is coupled to the frame, wherein the frame has a curved shape that generates a bending force that causes the display to curve;
 a window that covers an upper surface of the display such that one surface of a terminal body is formed, the window having a curved shape that corresponds to the curved display; and
 a case configured to accommodate the frame and comprising a window mounting portion to which the window is coupled, and a hollow portion that is surrounded by the window mounting portion to form a space to accommodate the frame, wherein the case is coupled to a printed circuit board (PCB), having a curved shape that corresponds to the curved shape of the frame, that covers the hollow portion and reinforces rigidity of the case such that a bending force that causes the window to curve is maintained.

2. The mobile terminal of claim 1, wherein the frame is curved along a specific direction of the terminal body such that the display has a curved shape along the specific direction.

3. The mobile terminal of claim 2, wherein the frame comprises a protruding bead to reinforce rigidity of the frame such that the generated bending force is maintained.

4. The mobile terminal of claim 3, wherein the bead extends along the specific direction.

5. The mobile terminal of claim 1, wherein a portion of the coupling member that corresponds to a central region of the display is affected by a force applied in a direction that the display is separated from the frame.

6. The mobile terminal of claim 5, wherein the coupling member comprises adhesive or adhesive tape.

7. The mobile terminal of claim 1, wherein the display comprises:
 a display panel to which an image is output; and
 a backlight unit that covers a rear surface of the display panel and is configured to emit light toward the display panel,
 wherein the coupling member is located between the backlight unit and the frame.

8. The mobile terminal of claim 7, wherein the frame comprises:
 an accommodating portion configured to accommodate the backlight unit, wherein the accommodating portion has a curved shape to generate a bending force that causes the backlight unit to curve; and
 first and second mounting portions,
 wherein a first end portion of the display panel is mounted on the first mounting portion and a second end portion of the display panel is mounted on the second mounting portion, and
 wherein a distance between the first and second mounting portions is shorter than a distance between the first and second end portions of the display panel such that the display panel is curved.

9. The mobile terminal of claim 8, wherein the first and second mounting portions are inclined toward the accommodating portion such that the display panel is curved toward the accommodating portion.

10. The mobile terminal of claim 1, wherein a mounting surface of the window mounting portion has a curved shape such that a bending force is generated that causes the window to curve.

11. The mobile terminal of claim 1, wherein the case further comprises a frame mounting portion having curved shape that corresponds to the curved frame and extending from the window mounting portion to cover a rear surface of the frame.

12. The mobile terminal of claim 11, further comprising an adhesive or adhesive tape between the frame and the frame mounting portion via which the frame is coupled to the frame mounting portion.

13. The mobile terminal of claim 11, further comprising:
 a boss protruding from the rear surface of the frame and inserted into a through hole of the frame mounting portion; and
 a coupling member inserted into the boss such that the frame is coupled to the case.

14. The mobile terminal of claim 1, further comprising an elastic pad between the frame and the PCB such that at least part of the frame is elastically supported.

15. The mobile terminal of claim 14, wherein the elastic pad surrounds a central region of the frame.

16. The mobile terminal of claim 1, wherein the window is coupled to the display.

17. The mobile terminal of claim 1, further comprising an air gap between the window and the display.

18. The mobile terminal of claim 1,
 wherein the frame is curved along a specific direction of a terminal body such that the display has a curved shape along the specific direction, and
 wherein the frame comprises a protruding bead to reinforce rigidity of the frame such that the generated bending force is maintained.

* * * * *